United States Patent [19]

Buckman et al.

[11] Patent Number: 4,642,028
[45] Date of Patent: Feb. 10, 1987

[54] CUFFED AIRCRAFT PROPELLER

[75] Inventors: William C. Buckman, Huber Heights; Michael R. Tapp, Dayton, both of Ohio

[73] Assignee: The Cessna Aircraft Company, Wichita, Kans.

[21] Appl. No.: 595,753

[22] Filed: Apr. 2, 1984

[51] Int. Cl.⁴ .................... B64C 11/20; B64D 15/00
[52] U.S. Cl. ................................ 416/95; 416/239; 416/245 R; 244/134 A
[58] Field of Search ............... 416/95, 239, 245 R, 416/248; 244/134 A, 134 D; 60/39.092, 39.093

[56] References Cited

U.S. PATENT DOCUMENTS

| 2,289,400 | 7/1942 | Woods | 416/245 R |
|---|---|---|---|
| 2,309,466 | 1/1943 | Martin | 416/239 |
| 2,408,677 | 10/1946 | Owner | 416/245 R |
| 2,592,214 | 4/1952 | Wallace | 416/239 |
| 2,614,638 | 10/1952 | Beaupre | 416/245 R |
| 2,743,890 | 5/1956 | La Rue | 244/134 D |
| 2,793,702 | 5/1957 | Cushman | 416/245 R |
| 2,886,112 | 5/1959 | Barish et al. | 416/245 R |
| 2,924,282 | 2/1960 | Perryman | 416/245 R |
| 2,934,150 | 4/1960 | Fink | 416/245 R |
| 4,419,053 | 12/1983 | Swearingen, Jr. | 416/245 R |

FOREIGN PATENT DOCUMENTS 2127495A 4/1984 United Kingdom .

Primary Examiner—Robert E. Garrett
Assistant Examiner—H. Edward Li
Attorney, Agent, or Firm—Biebel, French & Nauman

[57] ABSTRACT

A variable pitch propeller is provided with a blade cuff, with a radially inner portion of the cuff formed in closely surrounding relation to the cylindrical shank of the blade, and with a nose portion of the cuff extending radially outwardly and smoothly flaring to the full cordwise dimension of the cuff, through the conventional blade opening in a spinner. The arrangement eliminates regions for ice entrapment or build-up, and permits a heater boot to be applied to the leading edge down to or even into the blade opening.

3 Claims, 3 Drawing Figures

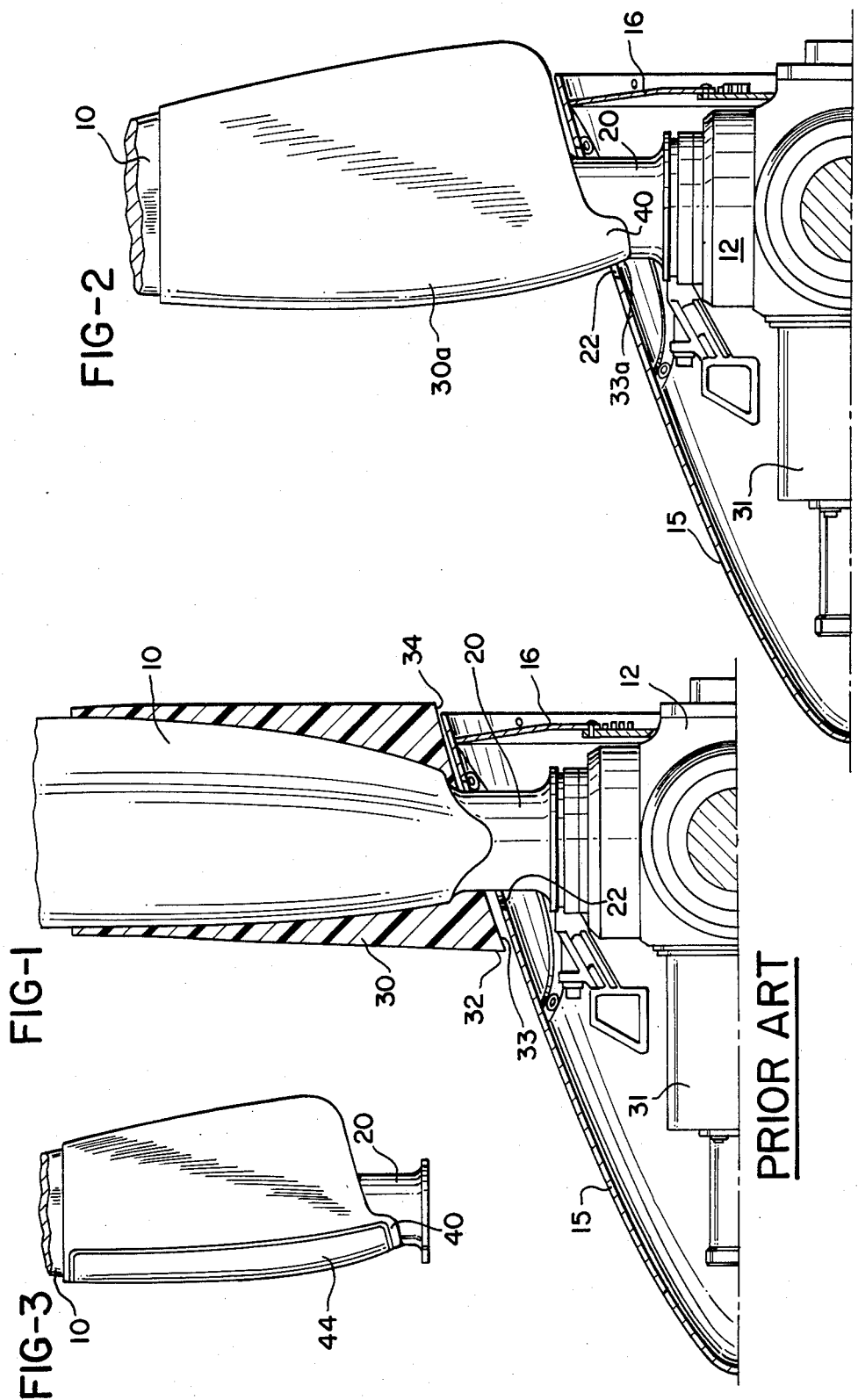

CUFFED AIRCRAFT PROPELLER

This invention relates to improvements to aircraft propellers, such as adjustable pitch aircraft propellers, and more particularly to a cuffed-typed propeller blade. Cuffed propeller blades have been commonly employed in adjustable pitch aircraft propellers for the purpose of increasing the airflow or the ram air for cooling of an aircraft engine, particulary during ground operations and during climbs. Cuffs have also been used to reduce spinner interference drag during flight. In a cuffed aircraft propeller, the radial inner spanwise stations of the propeller are fitted with a molded-in-place blade cuff in closely surrounding relation to the blade. The cuff may be provided with a somewhat increased elongated or more efficient airfoil section, such as for the purpose of increasing airflow from the blade into or over an aircraft engine, and this may have the effect of enhancing engine cooling or reducing spinner interference drag. Such a cuffed blade thus has dimensions at stations radially outwardly of the spinner which are commonly substantially greater than the blade opening formed in the spinner.

Thus, conventional blade cuff designs incorporated leading edges which essentially overhang the outer spinner surface with adequate clearance to prevent contact of the lower edge of the cuff with the outside surface of the spinner shell throughout the full propeller pitch range. Such range may extend from a negative pitch, in the case of beta propeller systems, to a full feathered position. This overhanging design provides certain inherent deficiencies and difficulties regarding the deicing of the propeller cuff at the leading edge of the cuff and at the interface between the cuff and the spinner. These deicing problems include: (1) the accumulation of ice at the inboard surface of the leading edge of the cuff, where it is not practical to place an electric deicing boot at such inboard boot edge; (2) the accumulation of ice on the radially inner surface of the cuff, that is between the cuff and the spinner, where it is not possible to deice with an electric boot and where centrifugal force does not aid in dispersing ice, even if a heating element could be employed to break the adhesion between the ice and the cuff. Where a large accumulation of ice eventually forms so that its increased mass causes the ice separation from the cuff, such a large mass of ice, if permitted to accumulate, can impinge against aircraft cabin structure causing damage, or at the least, concern and discomfort to passengers, and can also cause propeller imbalance. Finally, an ice bond can accumulate at the clearance gap between the lower edge of the cuff and the outside spinner shell surface which can, under certain conditions, cause the propeller to be locked in a given pitch, or can cause damage to the cuff or to the shell when pitch changes are called for. While resistance-type deicing boots or blankets could be applied to the inner shell surface to loosen this ice bond, this would require additional electrical feeds in the form of slip rings or the like, and would add substantially to the expense and to electrical system requirements.

SUMMARY OF THE INVENTION

The present application is directed to an improved propeller and blade cuff combination, which is particularly adapted for deicing, and which has enchanced anti-ice characteristics, and which is designed for use with spinners having conventional blade openings. Rather than terminate the blade cuff radially outwardly of the spinner with a portion in overhanging relation thereto, the blade cuff, at the radially inboard region thereof, is smoothed off, and curved cordwise inwardly toward the blade shank toward the portion of the blade having a circular diameter at its shank end. The blade cuff material is added as a skirt, partially surrounding the circular diameter of the blade, at a station radially inboard of the blade opening of the spinner, and conforming closely to the blade shank at such region. The nose of the cuff is thus smoothly carried from a region adjacent the blade shank out to the major cordwise portion of the cuff, so that the cuff extends continuously through the blade opening, without the necessity for enlarging the opening. Further, the cuff provides a mounting surface for an electrical deicing boot which may have its inner end positioned inwardly of the outer diameter of the spinner, that is, radially inwardly of the spinner blade opening, and extending from such region radially outwardly along the leading edge of the cuff, for ice removal. Thus, the blade and cuff combination of this invention permits centrifugal force to aid in ice removal, and allows a deicing boot to be positioned within the spinner area on the cuff for maximum deicing.

It is accordingly an important object of this invention to provide an aircraft propeller having a blade cuff thereon which extends through a more or less conventional spinner opening, and is skirted partially around the blade shank, providing an inwardly curved nose portion, eliminating a discontinuity between the propeller and the spinner, and providing a mounting surface for a deicing boot.

An additional object of the invention is the provision of a propeller having a blade cuff in which the cuff extends inwardly through a propeller opening and terminates in closely spaced relation to the shank of the blade.

These and other objects and advantages of the invention will be apparent from the following description, the accompanying drawings, and the appended claims.

BRIEF DESCRIPTION OF THE DRAWINGS

FIG. 1 is a partially sectional view showing a cuffed blade and spinner arrangement in accordance with the prior art;

FIG. 2 is a view similar to FIG. 1 showing a cuffed blade and spinner arrangement in accordance with the present invention; and FIG. 3 is an elevational view of a blade and cuff according to this invention, to which a heater boot has been attached.

DESCRIPTION OF PREFERRED EMBODIMENT

Referring to FIG. 1, a typical prior art arrangement of a cuffed variable pitch propeller blade is shown in which a blade 10, forming one of a number of arcuately spaced blades, is mounted for rotation with a hub 12. The hub 12 further supports a spinner 15, the large or inner end of which is supported and mounted on a bulkhead 16. As shown in FIG. 1, the blade 10 is provided with a radially inner shank 20, inwardly of the spinner 15, with the radially outer portion of the shank 20 extending through a blade opening 22 formed in the wall of the spinner 15. The blade opening 22 generally conforms rather closely to the propeller shank and the shank at regions generally inwardly of the blade opening, is cylindrical in shape. The blade 10 is shown as being provided with a typical conventional cuff 30 mounted or molded on the blade 10 at radial blade stations outwardly of the spinner 15. Conventionally, the propeller itself, immediately outwardly of the blade opening, assumes an airfoil secion of relatively short cord which tapers to a thinner and longer working cord at radially outer stations, beyond the cuff. The cuff 30, which is molded into an airfoil section of substantially longer cord than that of the blade, may be formed of a plastic material and in tightly fitting relation to the blade 10.

Conventionally, a variable pitch propeller is rotatable generally about its central axis, by a pitch changing mechanism 31 from a position of relatively low pitch to a position of high pitch or to a feathered position, and in some instances may be moved through the low pitch position to a reverse pitch position. Accordingly, the cuff 30 is caused to rotate with the blade outwardly of the spinner.

As shown in the typical prior art arrangement of FIG. 1, the cuff 30 is provided with a nose portion 32 which overhangs the spinner and is formed with a raked-backed inner surface 33 immediately outwardly of the spinner opening 22. In addition, the trailing edge 34 of the cuff 30 is shown in overhanging relation to the spinner itself.

Ice accumulations, particularly rime ice, accumulates at the area or regions of impact. Therefore, the primary region of accumulation is at the leading edge of the cuff and the blade. Further, ice can form at the gap or interface between the leading edge and the spinner. In the prior art, the leading lower edge 32 forms a close clearance gap with the spinner 15 for aerodynamic purposes. Commonly, electrical deicing boots are provided for the propeller and the cuff, for reducing the adhesion of the ice to the blade and permitting the aerodynamic and centrifugal forces to remove the ice in flight. However, as shown in FIG. 1, the cuff is provided with a substantial rake back or under surface 33, and it is not feasible to bring an electrical deicing boot completely to the lower leading edge 32 or to the surface 33. Therefore, such radially inner portions of the leading edge of the boot cannot practically be deiced, with the result that ice can accumulate, and further ice can accumulate on the underside surface 33 of the cuff where it is not feasible to properly deice, and where centrifugal force does not aid in dispersing ice even where a heating element could be employed to lower the ice adhesion. Therefore, sufficiently large accumulations of ice could form in this region. Additionally, an actual ice bond could be created in the clearance gap between the lower edge of the cuff and the outside surface of the spinner which, under unfavorable conditions, could lock the propeller in pitch, or cause some damage to the cuff when the propeller pitch change is called for.

The blade cuff and spinner combination of the present invention is illustrated in FIG. 2, in which it is seen that the conventional spinner blade opening 22 is retained without enlargement or without substantial enlargement. To this end, a modified cuff 30a is formed with a leading edge 33a, at radially inboard stations, which is relatively blunt and flat and which flares outwardly to the conventional configuration in radially outboard stations. Moving inboard, the improved cuff 30a curves gently inwardly cordwise and is carried continuously through the spinner opening 22 to a radially inner skirt portion 40 in partially surrounding relation to the blade at the shank 20 or the cylindrical portion thereof, as shown in FIG. 3. Accordingly, the conventional leading edge nose has been snubbed off and the cuff has been gently flared inwardly toward the blade circular diameter portion at the shank end, through the blade opening 22.

This configuration provides a leading edge which curves smoothly from the shank 20 to the forward-most portion of the cuff, and thus provides an interface between the cuff and the spinner, at the opening 22, which has minimum ice adhering tendencies. Further, since a smooth surface at the leading edge is formed at this region, including the blade opening 22, a foil-type propeller deicing heater, such as the heater 44 shown in FIG. 3, may be applied to the leading edge, with the inner end thereof actually brought through the blade opening 22, so that all opportunity for ice accumulation can be properly met. The cuff, at the skirt portion 40, is formed with minimum radial thickness and consistent with integrity. The loss of the forwardly projecting nose portion 33 is of little consequence as regards the overall efficiency of the cuff, and eliminates what is otherwise a rake-back situation forming the possiblity of an ice trap, as previously noted.

While the form of apparatus herein described constitutes a preferred embodiment of this invention, it is to be understood that the invention is not limited to this precise form of apparatus, and that changes may be made therein without departing from the scope of the invention which is defined in the appended claims.

What is claimed is:

1. In an aircraft blade and spinner combination in which a variable pitch blade, mounted on an aircraft hub, extends through a spinner opening, and in which the blade is provided with a generally cylindrical inner shank portion inwardly of the spinner, the improvement in blade cuff design comprising:
   a blade cuff on said blade with the major portion of said cuff positioned at spanwise stations radially outwardly of said spinner for increasing the airflow efficiency of said blade at the cuffed region,
   said cuff being flared radially inwardly through said spinner opening and terminating at least in partially surrounding relation to said blade shank, forming a smooth rearwardly sloping nose portion at the interface between said cuff and said spinner opening, for minimum ice adhering tendencies.

2. A cuffed-type variable pitch aircraft propeller adapted for operation on a propeller hub and spinner combination with a radially inner shank portion of the propeller extending through an opening in the propeller spinner in which the shank end of the propeller inwardly of the spinner is generally cylindrical in shape, the improvement in cuff configuration comprising:
   a radial portion of said cuff extending through said opening in said spinner and terminating in a skirt portion at least partially surrounding said propeller at said shank, said cuff having a leading edge which curves smoothly from said shank to the forward most part of said cuff outwardly of said opening, to provide an interface between said cuff and said spinner having minimum ice adhering tendencies, and providing a surface extending from a position inwardly of said opening, outwardly along the leading edge of said cuff, for the application of an electric deicing boot thereto.

3. The propeller of claim 2 further comprising a deicing boot on said cuff leading edge extending at least partially into said spinner through said opening.

* * * * *